(12) United States Patent
Quinn et al.

(10) Patent No.: US 8,128,058 B2
(45) Date of Patent: Mar. 6, 2012

(54) FLOW CONTROL DEVICE

(75) Inventors: Gregory F. Quinn, Fullerton, CA (US); Robert G. Morris, Yorba Linda, CA (US)

(73) Assignee: National Diversified Sales, Inc., Woodland Hills, CA (US)

( * ) Notice: Subject to any disclaimer, the term of this patent is extended or adjusted under 35 U.S.C. 154(b) by 955 days.

(21) Appl. No.: 12/107,724

(22) Filed: Apr. 22, 2008

(65) Prior Publication Data

US 2009/0261285 A1 Oct. 22, 2009

(51) Int. Cl.
*F16K 31/44* (2006.01)

(52) U.S. Cl. .............. 251/83; 251/95; 251/99; 251/288; 251/301

(58) Field of Classification Search ................ 251/95, 251/98, 99, 284, 285, 286, 288, 298, 301, 251/303, 82, 83, 337, 356; 137/15.18, 527, 137/527.2, 527.4, 527.6, 527.8, 454.2, 454.5, 137/454.6; 169/16, 17, 21, 22
See application file for complete search history.

(56) References Cited

U.S. PATENT DOCUMENTS 73,038 A 1/1868 Pollard
(Continued)

*Primary Examiner* — John Fristoe, Jr.
*Assistant Examiner* — Marina Tietjen
(74) *Attorney, Agent, or Firm* — Fulwider Patton LLP; David J. Pitman, Esq.

(57) ABSTRACT

A flow control device in which a flapper is continuously biased to the closed position by a leaf spring that may have a plurality of fingers. The same valve includes a shutoff mechanism allowing the user to adjust forward flow through the valve or shut it off entirely. The leaf spring is made to include polyoxymethylene.

5 Claims, 7 Drawing Sheets

U.S. PATENT DOCUMENTS

| | | | |
|---|---|---|---|
| 257,449 A * | 5/1882 | Pratt | 137/583 |
| 1,367,911 A * | 2/1921 | Koplin | 251/82 |
| 1,668,456 A * | 5/1928 | Jennings | 137/454.2 |
| 1,815,355 A * | 7/1931 | Hamilton | 169/21 |
| 1,866,766 A * | 7/1932 | Griffith | 169/21 |
| 1,955,686 A * | 4/1934 | Rowley | 169/9 |
| 2,196,592 A * | 4/1940 | Lowe et al. | 169/17 |
| 2,881,795 A | 4/1959 | Waldenmaier et al. | |
| 3,334,858 A * | 8/1967 | Hay | 251/82 |
| 4,252,144 A | 2/1981 | Scaramucci | |
| 4,271,020 A | 6/1981 | Van Meter | |
| 4,278,109 A | 7/1981 | Ortega | |
| 4,440,382 A | 4/1984 | Pruvot et al. | |
| 4,642,833 A | 2/1987 | Stoltz et al. | |
| 4,729,406 A | 3/1988 | Frentzel | |
| 4,809,741 A | 3/1989 | Scaramucci | |
| 4,832,078 A * | 5/1989 | Szekely et al. | 137/553 |
| 4,846,221 A * | 7/1989 | Kanemaru | 137/614.17 |
| 4,869,817 A | 9/1989 | Mendoza et al. | |
| 4,872,478 A | 10/1989 | Scaramucci | |
| 4,872,479 A | 10/1989 | Scaramucci | |
| 4,872,480 A | 10/1989 | Scaramucci | |
| 4,887,792 A * | 12/1989 | Kuo | 251/82 |
| 5,056,548 A | 10/1991 | Mills | |
| 5,156,183 A | 10/1992 | Scaramucci | |
| 5,161,570 A | 11/1992 | Scaramucci | |
| 5,328,152 A | 7/1994 | Castle | |
| 5,341,840 A | 8/1994 | Manson et al. | |
| 5,439,028 A * | 8/1995 | Meyer et al. | 137/556 |
| 5,452,744 A | 9/1995 | Otto | |
| 5,522,361 A * | 6/1996 | Pickman et al. | 123/336 |
| 5,622,205 A * | 4/1997 | Petersen | 137/527.8 |
| 5,741,005 A | 4/1998 | Vaughan et al. | |
| 5,904,338 A | 5/1999 | Unruh et al. | |
| 6,050,294 A | 4/2000 | Makowan | |
| 6,158,464 A | 12/2000 | Campbell et al. | |
| 6,247,489 B1 | 6/2001 | Maskell et al. | |
| 6,293,514 B1 | 9/2001 | Pechoux et al. | |
| 6,314,983 B1 | 11/2001 | Hatch | |
| 6,397,874 B1 | 6/2002 | Featheringill et al. | |
| 6,408,452 B1 | 6/2002 | Bromley | |
| 6,495,034 B1 | 12/2002 | Schmidtke et al. | |
| 6,546,839 B1 | 4/2003 | Jamra et al. | |
| 6,659,126 B2 | 12/2003 | Dunmire et al. | |
| 6,668,858 B1 | 12/2003 | Bazargan | |
| 6,691,981 B2 | 2/2004 | Hart | |
| 6,755,389 B2 | 6/2004 | Igarashi | |
| 6,932,100 B2 | 8/2005 | Martin et al. | |
| 6,994,107 B2 | 2/2006 | Sosa | |
| 7,021,386 B2 * | 4/2006 | Vick et al. | 166/332.8 |
| 7,137,405 B2 | 11/2006 | Barrows et al. | |
| 7,147,002 B2 * | 12/2006 | Reilly | 137/549 |
| 7,219,690 B2 | 5/2007 | McDonald et al. | |
| 7,249,611 B2 | 7/2007 | Scaramucci | |
| 7,322,423 B2 * | 1/2008 | Ringer | 169/17 |
| 7,673,695 B2 * | 3/2010 | Deurloo | 169/17 |
| 2010/0155427 A1 * | 6/2010 | Lilienthal et al. | 222/182 |

* cited by examiner

FLOW CONTROL DEVICE

BACKGROUND

The subject invention relates to valves. More specifically, the invention relates to check valves for use in controlling flow of fluids.

A variety of different valves have been developed for controlling fluid flow through pipelines. Most valves, regardless of type, comprise a housing member that supports a flow control mechanism within a chamber in the housing. The housing typically has two or more ports that are constructed for attachment to corresponding portions of pipelines. Some ports are provided with threaded connections, while others utilize a "slip fit" connection wherein a section of pipeline is slidably received in a socket formed in the valve housing. In such cases, the pipe is typically retained within the socket by an appropriate adhesive or means for attachment, such as welding, soldering, gluing, or mechanical attachment etc.

The flow control characteristics afforded by a valve are generally dependent upon the type of flow control member employed. In many pipeline applications, it is desirable to utilize valves that permit fluid to flow in only a single direction. In those instances, valves known as "check valves" are usually employed. Check valves are employed in a variety of residential and industrial applications where such unidirectional flow characteristics are desirable, such as with swimming pools, spas, outdoor water features and the like.

A number of differently configured check valves exist for maintaining unidirectional fluid flow within a pipeline system. One type of check valve, known as a "ball" check valve, employs a ball-shaped flow control member that is movably supported within the valve housing and is adapted to sealingly engage a seat adjacent to one of the ports. When fluid flows into the valve housing in one direction, the ball is forced out of contact with the seat and the fluid is permitted to pass through the valve. If the fluid attempts to flow through the valve in an opposite direction, the fluid forces the ball into contact with the seat to thereby prevent the fluid from flowing back through the valve.

Another type of check valve, known as a "swing" check valve employs a disc, or flapper, that is pivotally attached to the valve housing and is adapted to sealingly engage a valve seat that surrounds one of the valve ports. When fluid flows through the housing in a desired direction, the disc is forced out of contact with the seat by the fluid and the fluid is permitted to flow through the valve. Should the fluid attempt to flow back through the valve, however, the back-flowing fluid will pivot the disc into contact with the seat to seal off that port in a closed configuration. Thus, the fluid is prevented from flowing in reverse direction through the valve. Typically, in such cases, the disc is biased to the closed configuration by gravity, or by a metal spring. Both are prone to problems in that gravity may not provide a sufficiently strong bias toward the closed configuration, and where a metal spring is introduced problems of deterioration due to corrosion are typically not far behind.

Furthermore, while such valves can effectively limit flow to a single direction through a pipeline, such prior check valve designs have various additional shortcomings. For example, such prior check do not conveniently allow a user to restrict the amount of forward flow that such a valve will permit. Rather, where it is desired to place a restriction on the amount of forward flow that such a valve will permit, it may be necessary to install a shut-off valve in series with the check valve. This solution has the disadvantage of requiring additional labor, additional space for the serial plumbing installation, and additional cost for a separate shut-off valve.

Thus, there is a need for a check valve that may address shortcomings in the prior art. The flow control device of the present invention addresses these and other needs.

SUMMARY OF THE INVENTION

According to a preferred embodiment of the invention, there is described a flow regulation device, or valve, configured to address various disadvantages in the prior art. The valve includes a housing defining an internal chamber with an inlet port and an outlet port. A flapper is positioned within the chamber, and is configured to pivot to a first closed position to seal the inlet port against flow between the outlet port and the inlet port, and to pivot to a second open position to permit fluid flow between the inlet port and the outlet port. A limiting element is located within the chamber, and is adjustably positionable in relation to the flapper to limit the amount by which the flapper pivots. The limiting element may be positioned to prevent the flapper from pivoting at all. The configuration of a check valve in combination with a shut off valve in the same flow regulation device provides the advantage of cost reduction, space reduction, and labor saving when it comes to installation.

In another aspect of the invention, the limiting element is attached to a rotatable spindle and a first end of the spindle extends outside the housing chamber, the first end including a handle for rotating the spindle, wherein rotation of the handle changes the proximity of the limiting element to the flapper. The spindle has a second end opposite the first end, and preferably the second end terminates inside the housing chamber and is held against translational movement by a cylindrical bearing that is molded as an integral part of the housing. By terminating the second end inside the chamber, the opportunity for a leak to develop is reduced.

In a further aspect of the invention, the valve includes a plurality of teeth and the handle includes a detent. The handle is rotatable to a desired position where the detent is insertable into the teeth to lock the handle against further rotation. The handle acts as a cantilever spring for securing the detent in the teeth. Thus, when the user wishes to change the position of the handle, the user lifts the handle above the detents, moves the handle and releases it so that the detent snaps down on the teeth.

In a preferred embodiment of the invention, a non-metallic spring biases the flapper toward the closed position, and further preferably, the spring is a leaf spring having a first end and a second end wherein the first end has a cylindrical form, and the housing defines a tubular space with a slot for detaining the first end of the leaf spring to allow the second end to pivot about the first end. Under this configuration, the leaf spring acts as a flexible beam, supported by the housing at the first end and the second end. Further preferably, the leaf spring has a plurality of fingers configured to flex independently of each other, and, in a desired configuration, the leaf spring has multiple fingers, preferably three or four.

In yet a further aspect of the invention, the valve includes a rod extending within the chamber, and the flapper includes a cylindrical portion for receiving the rod and pivoting about the rod. The cylindrical portion defines at least one cam protrusion extending from the cylindrical portion, the cam protrusion being configured to engage the leaf spring whereby the leaf spring applies a force to the protrusion and biases the flapper toward the closed position. Preferably, the leaf spring has a plurality of fingers configured to flex independently of each other and are positioned so that each cam protrusion is engagable by a different finger. Under this configuration, the cam protrusions are oriented in relation to each other about the axis of the cylindrical portion so that, when the cylindrical portion is pivoted about the rod, a force is applied sequentially to each cam protrusion by a different finger of the leaf spring to bias the flapper to the closed position.

In yet a further aspect of the invention, the flapper includes a rigid door having a first planar surface and, attached to a second surface opposite the first surface, a clasping portion defining an indentation configured to receive a pin. A resilient gasket is attached to the first planar surface. A linking element for linking the door to the rod is provided, the linking element including a cylindrical portion at a first end, the cylindrical portion having a bore for receiving the rod to permit the linking element to rotate about the rod, the linking element further including a pin at a second end, the pin having a first elongate axis and being configured to be held by the indentation. A locking piece is provided and is configured to lock the pin into the indentation by mating detents positioned on the locking piece and on the door. The indentation is shaped in relation to the pin to permit both translational movement of the pin along the axis of the pin, and rotational movement of the pin about the axis of the pin. Preferably, the indentation is further shaped to permit rotational movement about a second axis extending through the pin, perpendicular to the axis of the pin and perpendicular to the first planar surface of the door, but further wherein the indention has a constricted waist to restrict translational movement of the entire pin in all directions other than along the axis of the pin. Under this configuration, the flapper may adjust its position against the inlet port to optimize the quality of the seal.

These and other advantages of the invention will become more apparent from the following detailed description thereof and the accompanying exemplary drawings.

DETAILED DESCRIPTION OF THE INVENTION

Figure 1:
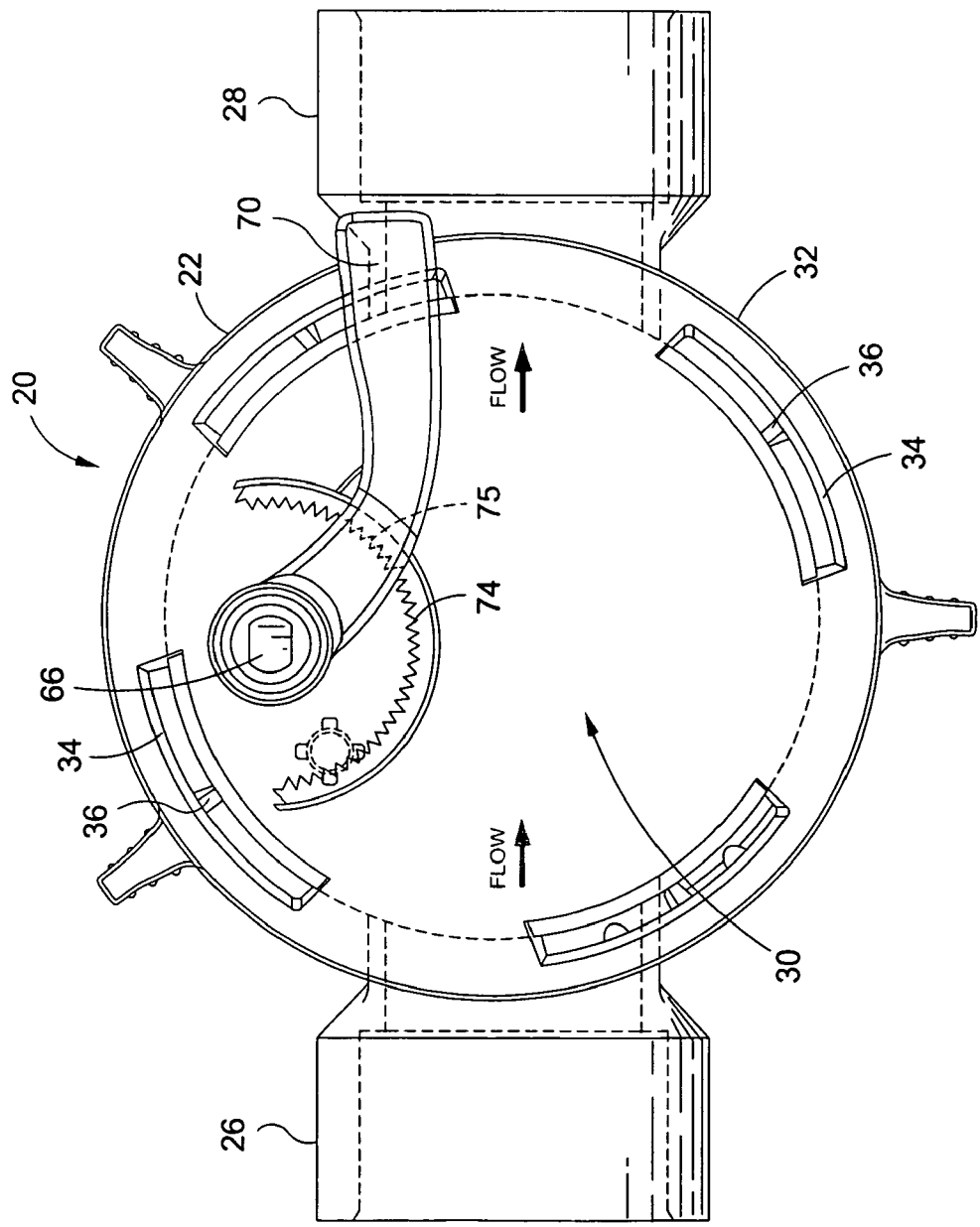
FIG. 1 a top view of a flow control device having features of the present invention.

With reference to the drawings, which are shown only for exemplification and not limitation, there is shown a valve generally identified by the numeral 20, having features of the claimed invention with initial reference to FIGS. 1-4. The valve 20 includes a housing 22, preferably of generally cylindrical shape, having an inner chamber 24 (FIG. 2) that is openable at the top to provide working access. The housing is preferably made of molded PVC, although any suitable material such as iron or brass may be used. The housing defines at least two ports 26, 28 each adapted to be connected with portions of a pipe (not shown) carrying fluid flow through the chamber 24 from inlet port 26 to outlet port 28. The inlet port 26 may enter the chamber via an orifice in a planar wall 29 which is configured to provide a suitable planar seat 31 (FIG. 2) for sealing engagement with a flow regulation mechanism, described below.

Figure 2:
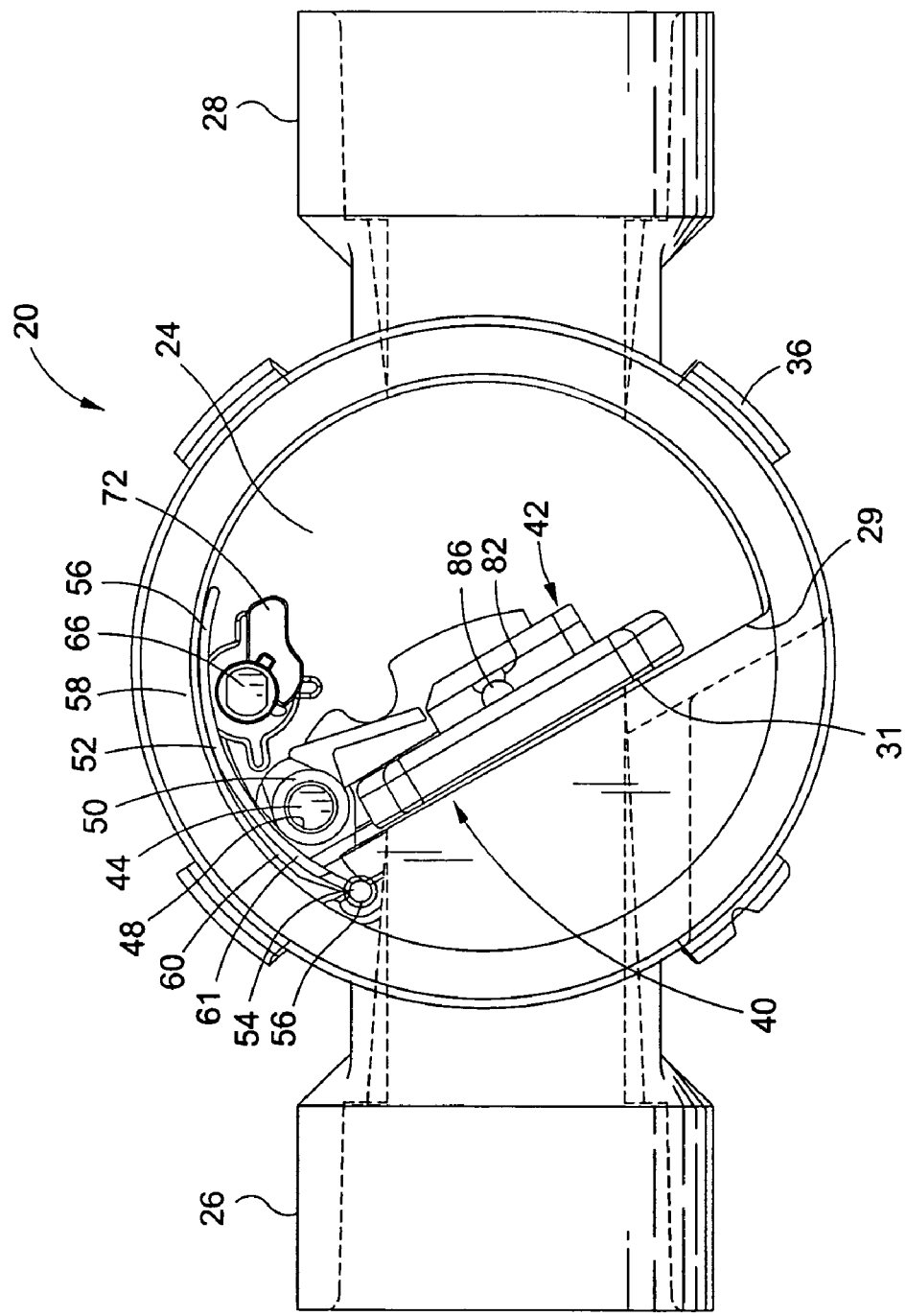
FIG. 2 is a top interior view of the flow control device of FIG. 1.
Figure 3:
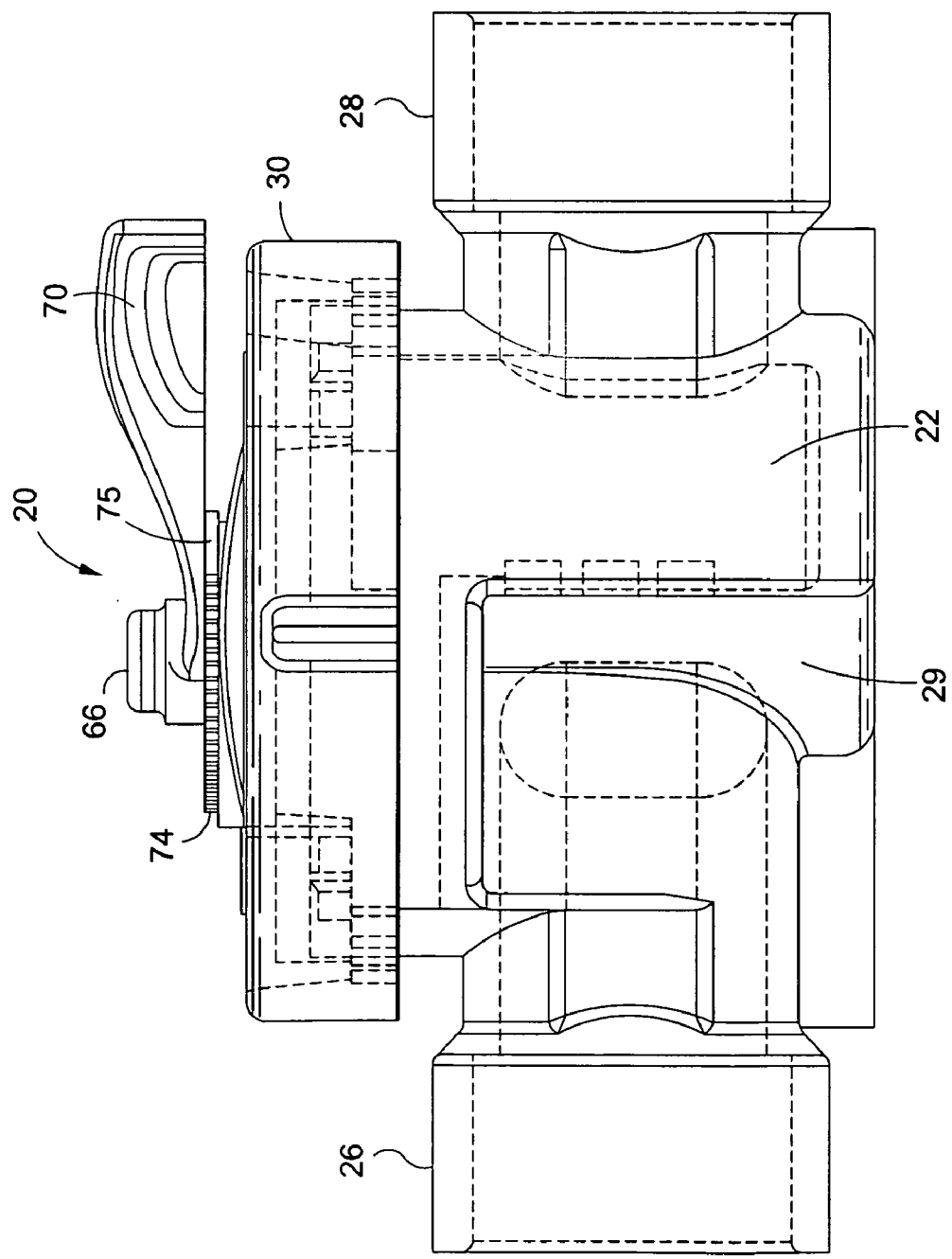
FIG. 3 is a side elevational view of the flow control device of FIG. 1.

As best seen in FIGS. 1 and 2, a removable lid 30 is provided for covering the top of the chamber 24. A ring lock 32 is provided for rotational engagement between mating detents 34, 36 on the ring lock and housing 22 respectively, whereby the ring lock 32 may be installed to tie down the lid 30 onto the housing with a fluid tight seal in a conventional way. Preferably, both the lid and the housing are made of transparent PVC, to enable direct inspection of the chamber 24 in case of malfunction, without having to disassemble the unit. Additionally, the inlet and outlet ports 26, 28 may be sized both as sockets to receive internally a standard size pipe, and also as spigots to fit internally into a standard sized pipe fitting. This arrangement provides enhanced flexibility and reduces the need for adaptors to step up or down onto the pipe size to be attached.

Figure 4:
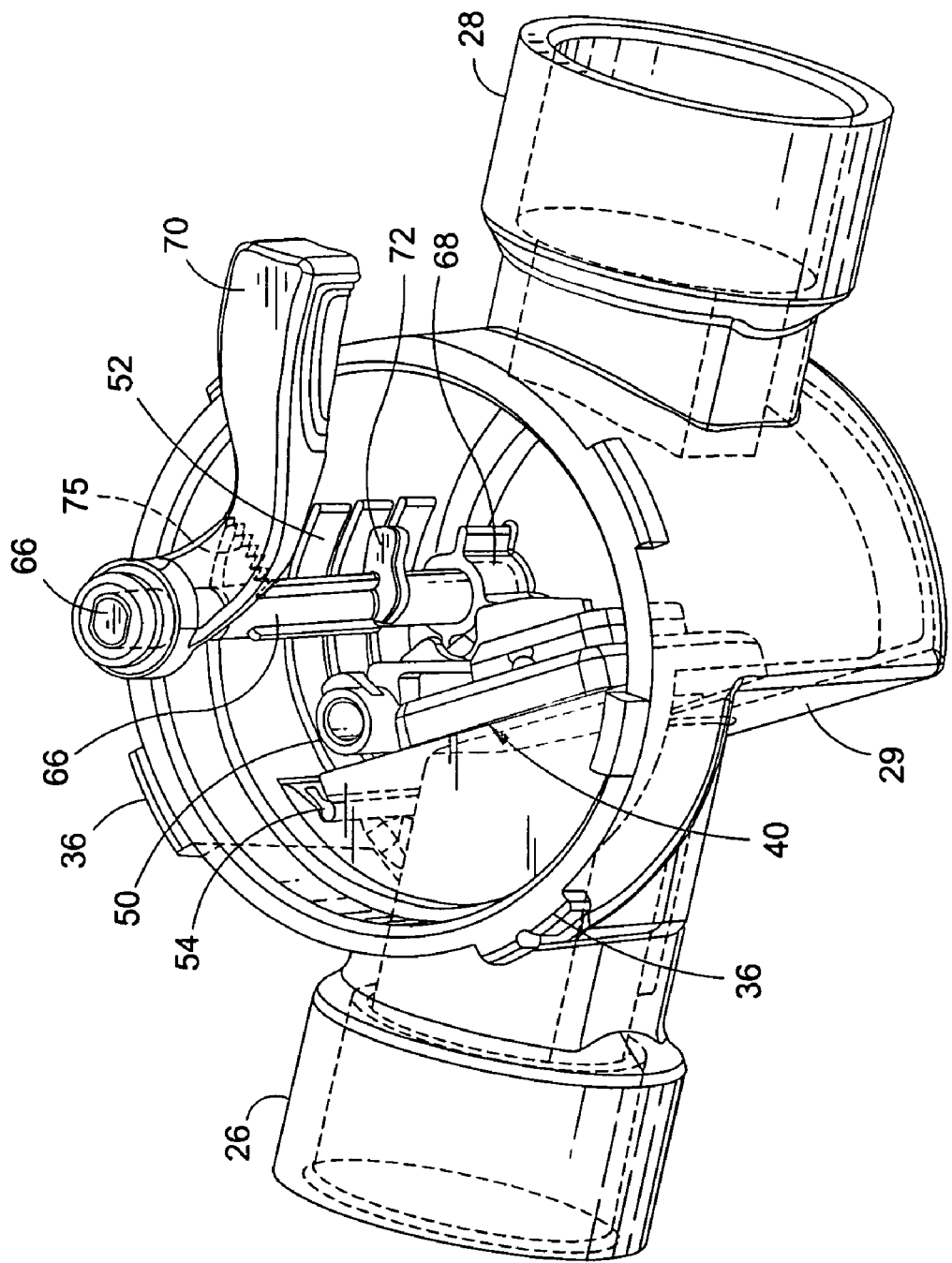
FIG. 4 is a perspective interior view of the flow control device of FIG. 1.

As best seen in FIGS. 2 and 4, within the housing chamber 24 is located a flow regulation mechanism, generally identified by the numeral 40, for regulating fluid flow between the two ports 26, 28. The mechanism 40 includes a flapper 42, pivotable on a rod 44. The rod preferably comprises two rod parts (not shown separately), the one part extending downwardly from the lid 30 to enter an upper entrance to a bore 48 in a cylindrical portion 50 on an inner portion of the flapper, the other part extending upwardly from the chamber floor, to enter a bottom entrance of the bore 48. The flapper 42 is configured to pivot about the rod 44 between a closed position (as seen in FIGS. 2, 4) and an open position (not shown). In the open position, the flapper permits fluid flow from the inlet port 26 to the outlet port 28. In the closed position, the flapper 42 seals the inlet orifice of the inlet port 26 against back-flow. Specifically, any back-flow, or tendency of the fluid to flow from the outlet port 28 back through the inlet port 26, will cause the flapper to close onto the seat 31 surrounding the orifice in the wall 29 because the flapper is angled into the backflow that will press the flapper to seal against the seat.

A biasing means is provided to urge the flapper 42 toward the closed position. Thus, any forward flow through the chamber must overcome the closing force of the biasing means. In a preferred embodiment, the biasing means is a leaf spring 52. The leaf spring is positioned adjacent the cylindrical portion 50 of the flapper, as seen in FIGS. 2, 4. A first end 54 of the leaf spring is shaped to include a portion with a cylindrical profile that is configured to be inserted into a mating tubular opening 56 with a slot, defined by a wall of the housing for detaining the leaf spring against translation, but allowing a degree of rotation about the first end 54. A second end 56 of the leaf spring extends along a wall 58 of the housing, so that a gap 60 exists between the wall 58 and the leaf spring 52, as best seen in FIG. 2. Preferably, without limiting the scope of the invention, the leaf spring may be made of or include polyoxymethylene which is selected for its durability in water, including water that may contain chlorine, and which is advantageous over metal which tends to oxidize in such conditions. This compound is available from duPont under the trade name "Delrin."

Figure 6:
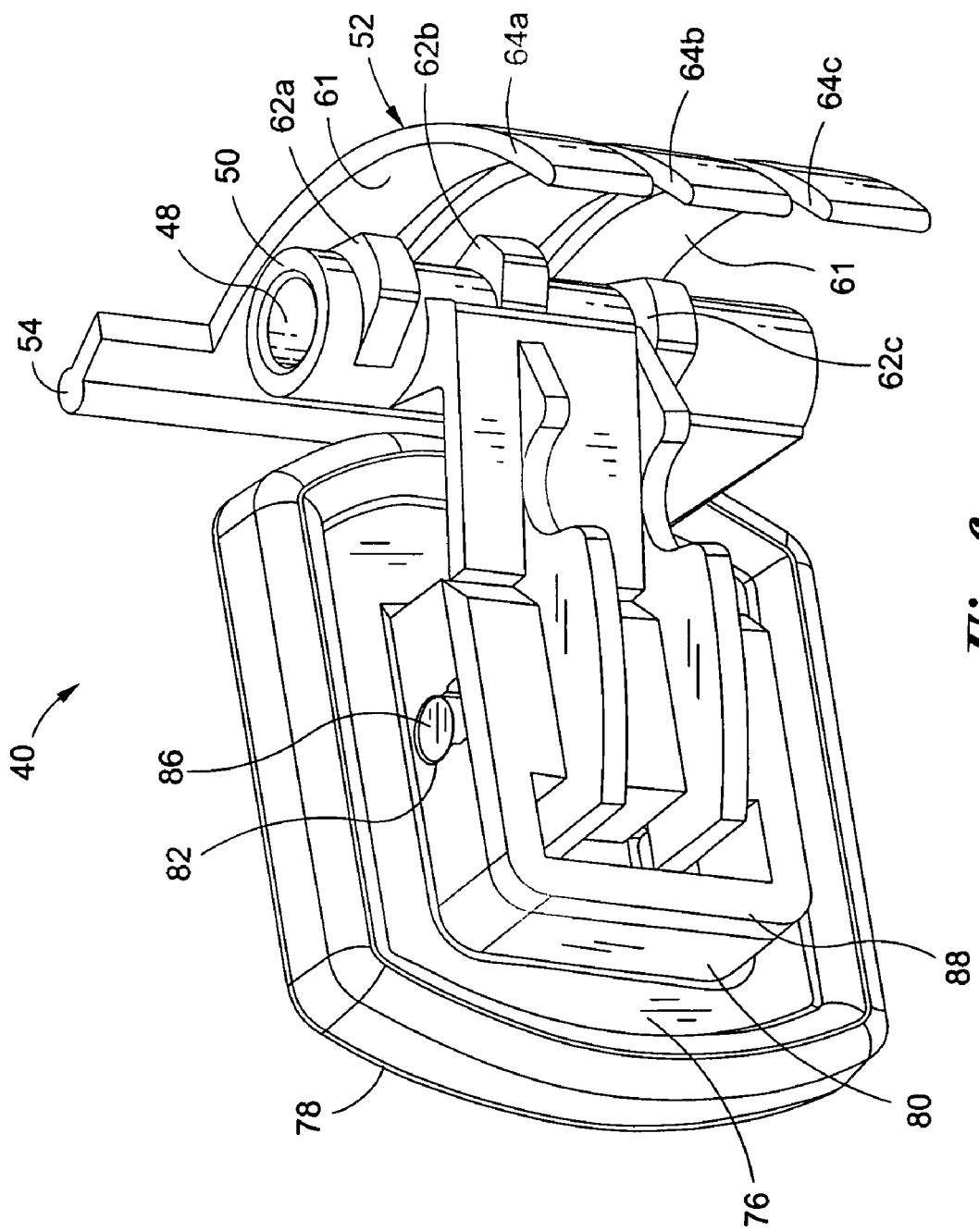
FIG. 6 is a perspective view of the flapper in relation to a biasing element of the flow control device of FIG. 1.

The significance of the gap 60 is that it permits the leaf spring 52 to act as a deflection beam supported between its two ends 54 and 56, with a middle portion 61 deflectable into the gap 60. The cylindrical portion 50 of the flapper defines at least one cam protrusion, preferably three cam protrusions 62a, 62b and 62c, as best seen in FIG. 6, or even four protrusions. The at least one cam protrusion is oriented on the cylindrical portion 50 so that middle portion 61 of the leaf spring continuously biases at least one of the cam protrusions no matter what the orientation of the cylindrical portion 50, and this bias in turn biases the flapper 42 toward the closed position. (FIGS. 2, 4). When more than one cam protrusion is provided, the leaf spring 52 may be configured to include an equal number of fingers. Thus, in the preferred embodiment, there are three fingers 64a, 64b and 64c. Each cam protrusion 62a, 62b, 622c is positioned on the cylindrical portion 50 of the flapper with a slightly different rotational orientation, as seen in FIG. 6 so that, when the flapper is rotated about the rod 44, just as the biasing load on one cam protrusion is diminishing as applied to one finger, the next finger applies a new increased biasing load against the next cam protrusion, so that there is a continuous load between at least one finger and one cam protrusion, thus continuously tending to force the flapper to the closed position regardless of the degree to which the flapper is opened.

In another aspect, the invention permits a user of the valve to set the maximum extent to which the flapper 42 may be opened. In known check valves, the flow of fluid between inlet and outlet ports typically forces a flapper open to an uncontrolled degree. The higher the water pressure, the further open the flapper is forced, and the greater the fluid flow. However, the present invention allows the user to adjustably set the degree to which the flapper may open, and may even shut the valve against fluid flow entirely if so desired.

To achieve this result, there is provided an elongate spindle 66 which is positioned adjacent to and parallel with the rod 44, as best seen in FIGS. 1-4. Preferably, the spindle extends from the exterior of the lid 30, through an opening in the lid, where the spindle's upper end is restrained against translational movement, and into the chamber 24, where its lower end is planted in a cylindrical bearing 68 (FIG. 4) on the chamber floor that fixes the lower end against translational movement. Preferably, the bearing is molded as a unitary part of the housing 22. The spindle 66 may rotate about its axis, and a handle 70 is fixed to its upper end, to allow the user to rotate the spindle. At a point on the length of the spindle an arm 72, or limiting element, is positioned to extend away from the axis of the spindle. When the spindle 66 is rotated via the handle 70, the arm 72 may be moved to a position adjacent the flapper 42 so that when the flapper is opened by the force of fluid flowing through the chamber 24, the arm 72 may stop the flapper from further opening movement, or it may stop it from opening at all. The spindle may be locked in position by means of a series of ratchet teeth 74 on the outer surface of the lid 30. The handle has a detent 75 (FIG. 4) on a lower surface of the handle that is configured to engage with the teeth 74, thereby locking the handle against rotation once the handle is set in a chosen position in the teeth. The handle acts as a cantilever spring to bias the detent into engagement with the teeth. Thus, when the user wishes to alter the setting of the flapper 42, he lifts the handle 70 slightly against the bias of the handle to disengage the detent 75 from the teeth 74. When a desired setting for the handle is reached after some rotation, the user may let go of the handle, and the biasing force of the handle urges the detent downwardly to engage the detent with the teeth so as to prevent further rotation of the spindle 66. In this way, the user may set the handle 70, and hence the arm 72, to a position as desired that will partially, or even completely, prevent the flapper 42 from opening, and which may therefore partially or completely close the valve 20 against forward fluid flow.

Figure 5:
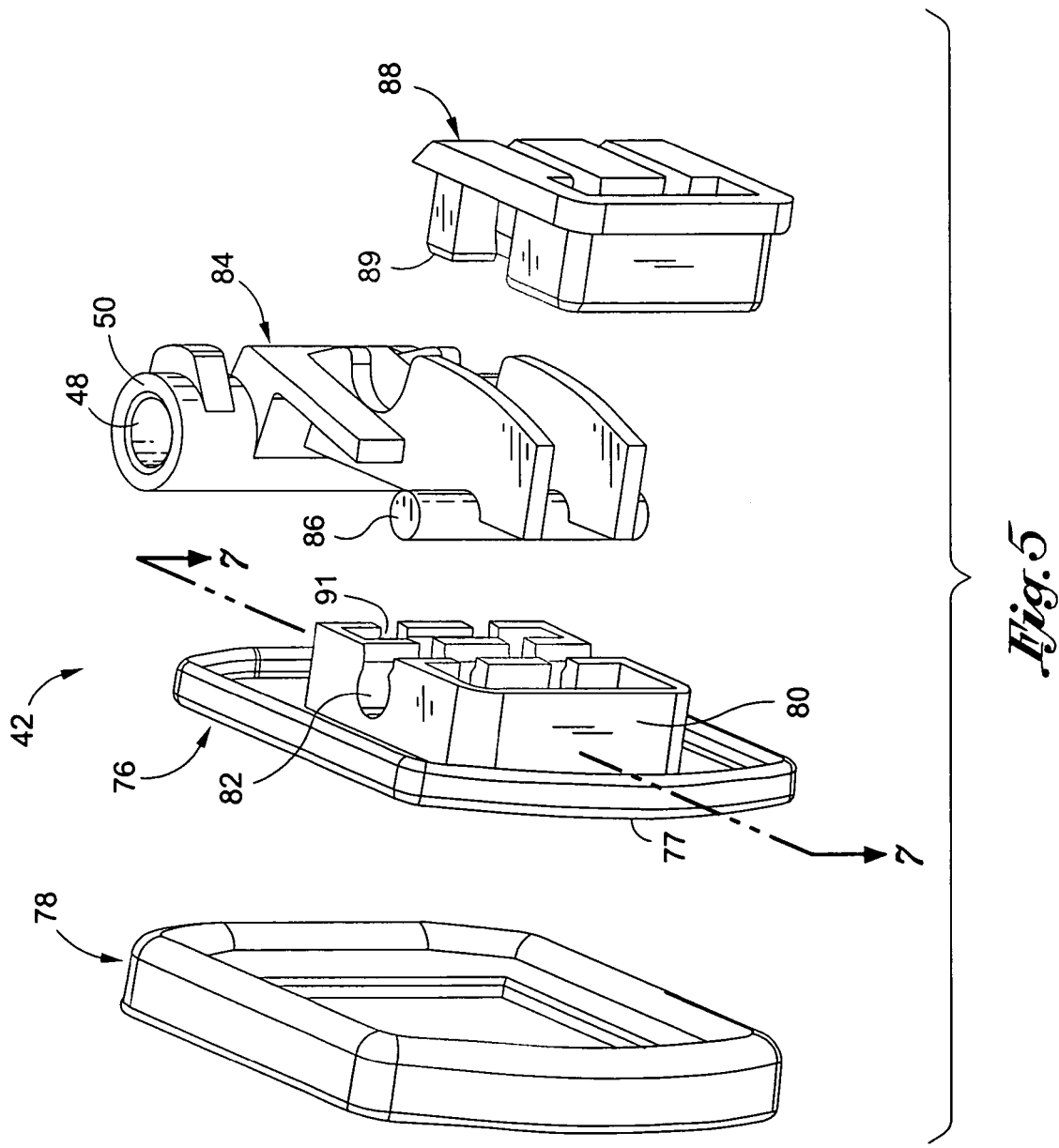
FIG. 5 is a perspective exploded view of a flapper of the flow control device of FIG. 1.

In another aspect of the invention, the flapper 42 is constructed to provide an improved seal against the planar seat 31 on the wall 29 of the chamber 24. As may be seen in FIGS. 5, 6, the flapper 42 may be assembled to include four parts. First, a rigid door 76 is provided having a planar surface 77. Second, a flexible gasket 78 is attached to the door by way of an over-mold process to provide a resilient sealant on the planar surface 77 of the door. On an opposite second surface of the door, the door defines a clasping portion 80 that extends from that opposite surface and that further defines an indentation 82. Third, a linking element 84 is provided for linking the door to the cylindrical portion 50 so that the entire flapper may rotate about the rod 44 inserted within the bore 48 of the cylindrical portion. At one end, the linking element includes a vertical cylindrical pin 86 that is received into the indentation 82 of the clasping portion 80. At an opposite end of the linking element the cylindrical portion 50, described above, is positioned to be pivotably supported by the rod 44. Fourth, a locking piece 88 is provided for securing the pin 86 in the indentation 82. The locking piece 88 locks onto the door by means of mating detents 89, 91 positioned on the locking piece 88 and on the door 76.

Figure 7:
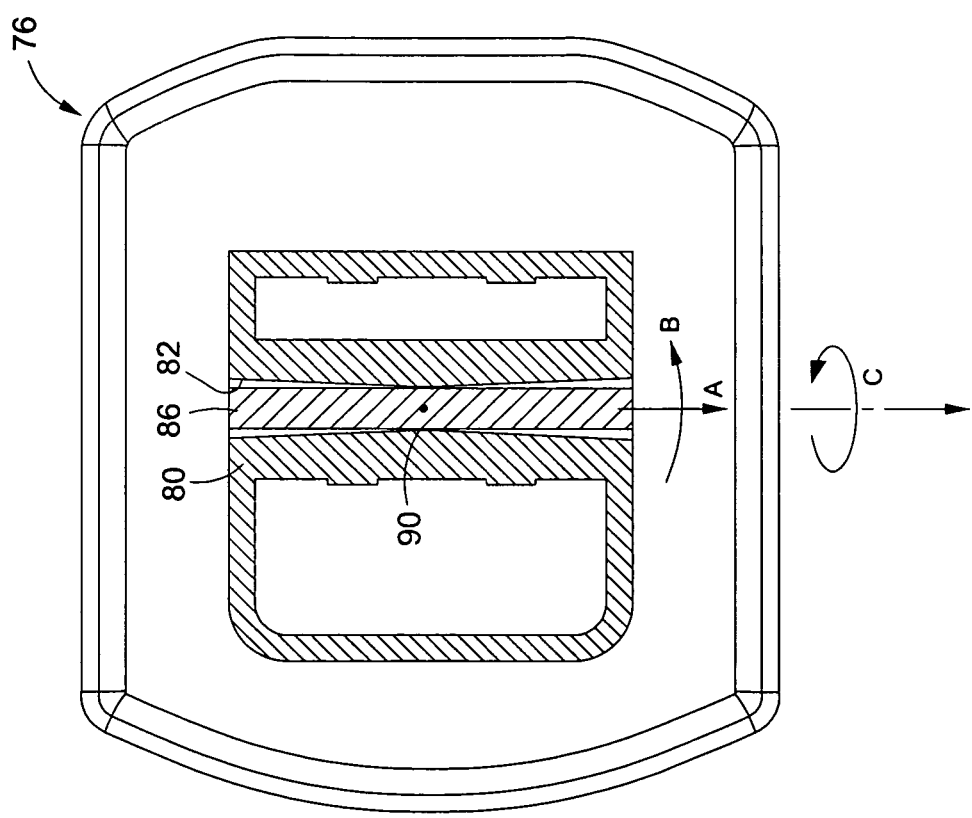
FIG. 7 is a sectional view of the flapper of FIGS. 5 and 6, viewed vertically, with the section being taken substantially along the line 7 as indicated in FIG. 5.

In a further aspect of the invention, the indentation 82 is shaped to permit a specifically engineered amount of "play" in the movement of the cylindrical pin 86 within the indentation so as to permit the door 76 and its gasket 78 to assume an optimal seat on the wall 29 at the inlet port 24. To this end, as seen by reference to FIG. 7, the indentation is shaped to have a waist 90, or constriction at a point between its ends, that will constrain translational movement of the entire pin in translational directions other than along the axis of the pin (as indicated by the arrow "A"), but will nevertheless permit the pin to rotate with at least two degrees of rotational freedom about the constriction point. As seen in FIG. 7, the pin may rotate at least about its own axis (as indicated by the arrow "C"), and about an axis extending perpendicular to the pin axis and perpendicular to the planar surface of the door (as indicated by arrow "B"). By thus constraining the pin against some degrees of freedom, but by allowing other degrees of freedom, the door and gasket may adjust to small variations that may occur in the quality of the seating to optimize the seal, yet the door is nevertheless held under positive restraint to prevent the seal from degenerating over time.

Thus, there has been described a mechanism that provides a novel flow control device for preventing back flow, in which the flapper is continuously biased to the closed position by a leaf spring that may have multiple independent fingers. The invention eliminates the need for a metal biasing element, allowing a biasing element formed of or including polyoxymethylene to be used in a hostile chemical environment where metal would tend to rapidly corrode. Additionally, the same valve includes a shutoff or isolation mechanism allowing the user to manually adjust forward flow through the valve or shut it off entirely. This combination of functions in a single valve provides the advantage of eliminating the need to separately install both a check valve and a shut-off valve in series in a plumbing arrangement. Rather, it allows a single installation to provide for both functions thus saving on labor, input cost, and space. Additionally, the transparent body and the removable lid permits the user to inspect from the outside, and gain access to the chamber, for removing debris or even for replacing parts that have worn or lost functionality, without the need for tools.

Thus, it is seen that the flow control device of the present invention provides novel and useful features for controlling the flow of fluid through a valve, and overcoming shortcomings in the prior art. The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

We claim:

1. A valve comprising:
   a housing defining an internal chamber with an inlet port and an outlet port;
   a flapper within the chamber, the flapper being configured to pivot to a first closed position to seal the inlet port against flow between the outlet port and the inlet port, and to pivot to a second open position to permit fluid flow between the inlet port and the outlet port;
   a limiting element within the chamber, the limiting element being adjustably positionable in relation to the flapper to limit the amount by which the flapper pivots including to prevent the flapper from pivoting at all and
   wherein a leaf spring having a first end and a second end biases the flapper toward the closed position, and further wherein the valve includes a rod extending within the chamber, and the flapper includes a cylindrical portion for receiving the rod and pivoting about the rod, and further wherein the cylindrical portion defines at least one cam protrusion extending from the cylindrical portion, the at least one cam protrusion being configured to engage the leaf spring whereby the leaf spring applies a force to the protrusion and biases the flapper toward the closed position.

2. The valve of claim 1, wherein the leaf spring has a plurality of fingers configured to flex independently of each other and positioned so that each cam protrusion is engagable by a different finger, wherein the cam protrusions are oriented in relation to each other about the axis of the cylindrical portion so that, when the cylindrical portion is pivoted about the rod, a force is applied independently to each cam protrusion by a different finger of the leaf spring to bias the flapper to the closed position.

3. A valve comprising:
   a housing defining a chamber with an inlet port and an outlet port;
   a pivotable flapper within the chamber, the flapper being pivotable upon a rod and being configured to seal the inlet port against flow between the outlet port and the inlet port, and to permit fluid flow between the inlet port and the outlet port, the flapper including:
   a rigid door having a first planar surface and, attached to a second surface opposite the first surface, a clasping portion defining an indentation configured to receive a pin;
   a resilient gasket attached to the first planar surface;
   a linking element for linking the door to the rod, the linking element including a cylindrical portion at a first end, the cylindrical portion having a bore for receiving the rod to permit the linking element to rotate about the rod, the linking element further including a pin at a second end, the pin having a first elongate axis and being configured to be held by the indentation;
   a locking piece configured to lock the pin into the indentation by mating detents positioned on the locking piece and on the door;
   wherein, the indentation is shaped in relation to the pin to permit both translational movement of the pin along the axis of the pin, and rotational movement of the pin about the axis of the pin; and
   wherein the indentation is shaped to further permit rotational movement about a second axis extending through the pin, perpendicular to the axis of the pin and perpendicular to the first planar surface of the door, but further wherein the indention has a constricted waist to restrict translational movement of the entire pin in all translational directions other than along the axis of the pin.

4. A valve comprising:
   a housing defining an internal chamber with an inlet port and an outlet port;
   a flapper within the chamber, the flapper being configured to pivot to a first closed position to seal the inlet port against flow between the outlet port and the inlet port, and to pivot to a second open position to permit fluid flow between the inlet port and the outlet port;
   a leaf spring biasing the flapper toward the closed position, the leaf spring having a first end and a second end, the first end having a cylindrical profile, and the housing defining a tubular space with a slot for detaining the first end of the leaf spring for allowing the second end to pivot about the first end and permitting the leaf spring to act as a flexible beam supported by the housing at the first end and the second end; and
   wherein the valve includes a rod extending within the chamber, and the flapper includes a cylindrical portion for receiving the rod and pivoting about the rod, and further wherein the cylindrical portion defines at least one cam protrusion extending from the cylindrical portion, the at least one cam protrusion being configured to engage the leaf spring whereby the leaf spring applies a force to the protrusion and biases the flapper toward the closed position.

5. The valve of claim 4, wherein the leaf spring has a plurality of fingers configured to flex independently of each other and positioned so that each cam protrusion is engagable by a different finger, wherein the cam protrusions are oriented in relation to each other about the axis of the cylindrical portion so that, when the cylindrical portion is pivoted about the rod, a force is applied independently to each cam protrusion by a different finger of the leaf spring to bias the flapper to the closed position.

* * * * *